Patented Apr. 19, 1927.

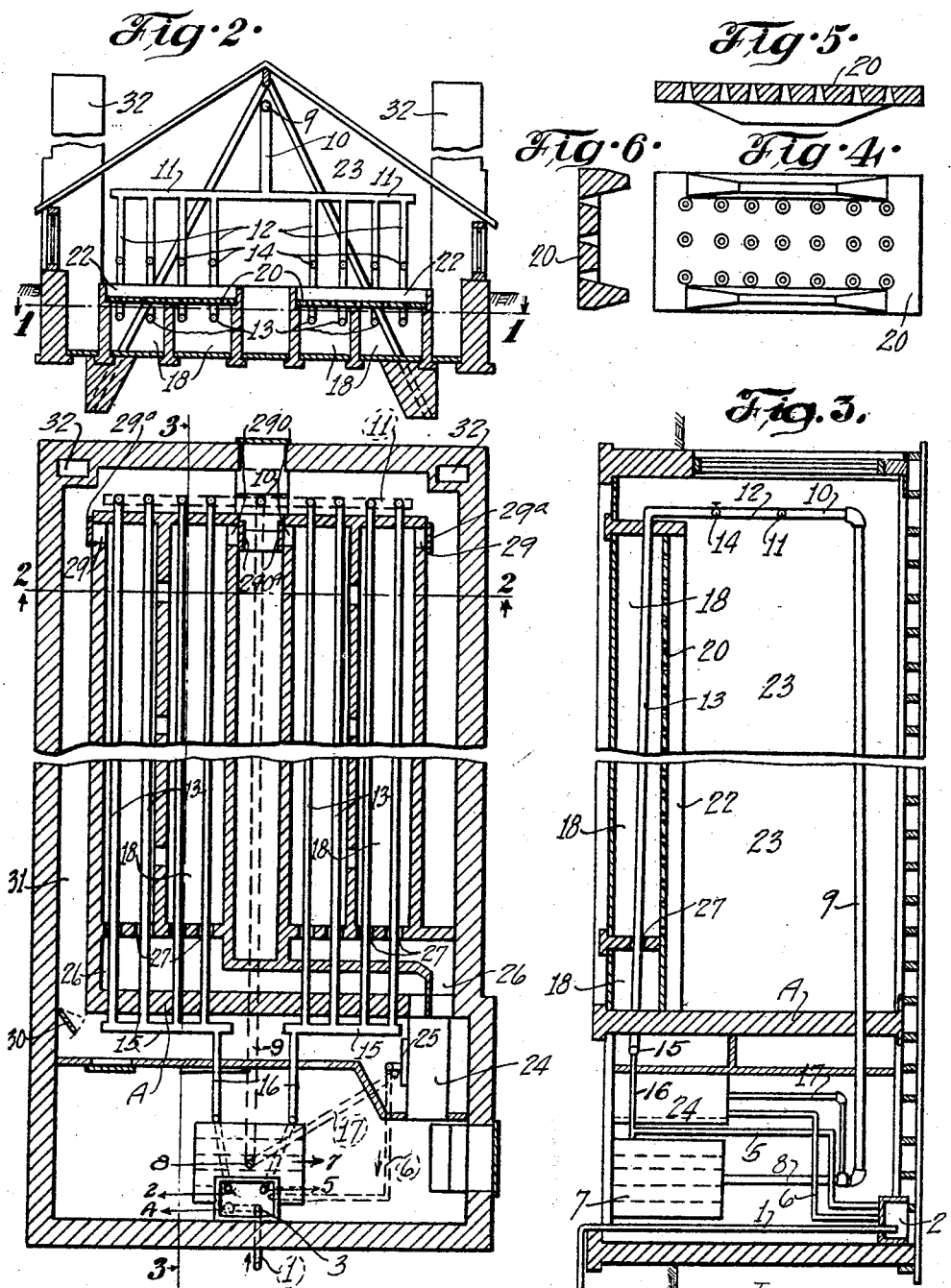

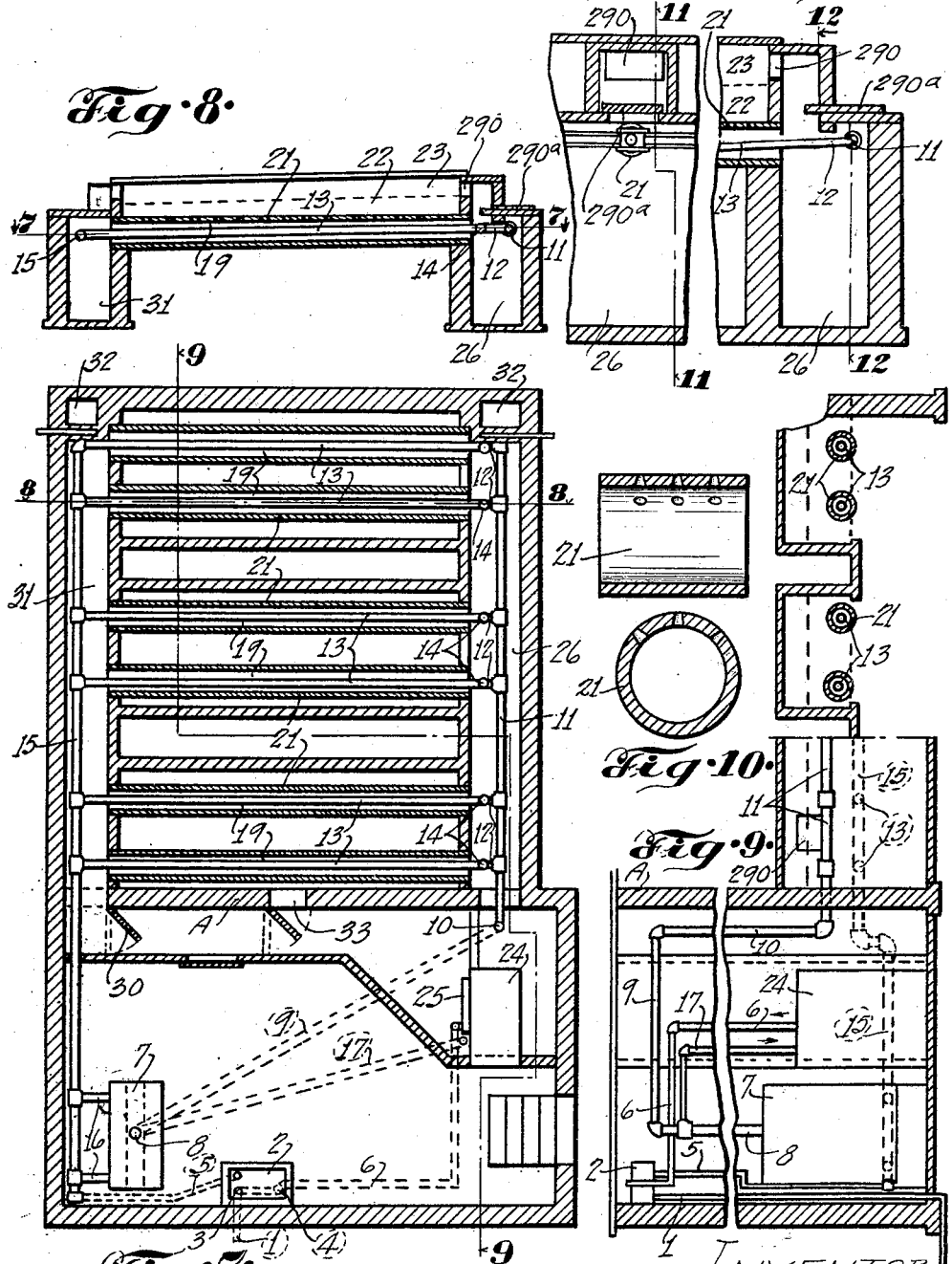

1,625,181

UNITED STATES PATENT OFFICE.

JOHN ZELLWEGER, OF ST. LOUIS, MISSOURI.

PROCESS AND APPARATUS FOR INDUCING GERMINATION AND GROWTH OF SEEDS AND PLANTS.

Application filed August 1, 1924. Serial No. 729,515.

This invention relates to apparatus of the kind that are used to induce the germination and growth of seeds and plants and which are commonly referred to as greenhouses, forcing pits, hot boxes and forcing fields.

One object of my invention is to provide a novel process for inducing the germination and growth of seeds and plants, that is economical, easy to control and capable of producing results not possible to attain with the processes heretofore employed for inducing the germination and growth of plants in soil beds.

Another object of my invention is to provide a highly efficient apparatus of simple design for practicing my process.

Briefly stated, my process consists in supplying heat, moisture and air directly to a soil bed which contains plant food, and effectively distributing said elements throughout the entire area of said bed, preferably simultaneously or in one operation, so as to maintain the soil bed in a porous and healthy condition and cause heat and moisture to be applied directly to the seeds and plant roots in the soil bed. The apparatus that is used to practice my process may be constructed in various ways, but it will usually comprise a perforated or porous supporting structure for the soil bed, and means for blowing warm, humid air through said structure and upwardly into the soil bed throughout substantially the entire area of same, thereby ventilating the bed and applying heat and moisture to the plant seeds or roots contained in the bed. While the temperature of the air that is introduced into the soil bed may vary, it should never be in excess of 120° F., so as to be sure that the seeds and plant roots will not be injured.

In the various kinds of forcing apparatus now used to promote growth of plants, the heat that is required to produce germination and growth of the seeds or plants in the soil bed is either radiated onto the top surface of the soil bed from a source of heat arranged above the soil bed, or is conducted to the bottom surface of the soil bed usually from a body of hot manure located directly underneath the soil bed. In some instances hot fire flues or hot water or steam pipes are located at the sides or at the bottom of the soil bed, so as to heat said bed by conduction. In still other cases the water required for germination and growth is applied to the soil bed either by sprinkling it over the top surface of same or by sub-irrigation from perforated pipes at the bottom of the soil bed, and atmospheric air at atmospheric pressure and temperature is depended upon to ventilate the bed by diffusion through the interstices of the bed. Obviously, such a process for forcing the germination and growth of plants is inefficient; it is wasteful and it is hard to control, because conduction and convection are relied upon to convey the heat through the soil bed to the seeds and plant roots, because capillarity of the soil bed is depended upon to carry the water to the seeds and plant roots, and because variation in atmospheric pressure is depended upon to produce ventilation of the soil bed. In my process an adequate supply of heat and moisture directly to the seeds or plant roots is assured and sufficient air is introduced forcibly into the soil bed and distributed through the same to insure proper ventilation of said bed. Other objections to the conventional process used to force seeds and plants, is that a great deal of time and labor are involved in the operation of sprinkling the soil bed, that the water used in the sprinkling operation often chills the plants and interferes with the growth of same, and that said water tends to form a hard crust or top surface on the soil bed through which air cannot penetrate to ventilate the soil bed. My process has none of the objectionable characteristics just mentioned, for in my process water is introduced into the soil bed as vapor by currents of air that enter said bed from the underside of same, from air ducts or chambers to which warm, humid air is supplied by a mechanical means.

My invention is applicable to greenhouses, forcing pits, hot boxes and forcing fields, but I have herein illustrated only two types or kinds of apparatus embodying my invention, one consisting of a greenhouse illustrated in Figures 1 to 6 of the drawings, and the other consisting of a group of hot boxes illustrated in Figures 7 to 12, inclusive, of the drawings.

Figure 1 of the drawings is a horizontal sectional view of a greenhouse constructed in accordance with my invention, taken on the line 1—1 of Figure 2.

Figure 2 is a transverse sectional view, taken on the line 2—2 of Figure 1.

Figure 3 is a vertical longitudinal sectional view, of the greenhouse shown in Figure 1, taken on the line 3—3 of Figure 1, looking in the direction indicated by the arrow.

Figure 4 is a bottom plan view of one of the tiles used in the construction of the perforated supporting structure for the soil bed.

Figure 5 is a longitudinal sectional view of said tile.

Figure 6 is a transverse sectional view of said tile.

Figure 7 is a horizontal sectional view of a group of hot boxes constructed in accordance with my invention, taken on the line 7—7 of Figure 8.

Figure 8 is a transverse sectional view, taken on the line 8—8 of Figure 7.

Figure 9 is a vertical longitudinal sectional view of the group of hot boxes shown in Figure 7, taken on the line 9—9 of Figure 7, looking in the direction indicated by the arrows.

Figure 10 illustrates in transverse section and in longitudinal section one of the perforated tile used in the construction of the perforated air ducts of the apparatus shown in Figure 7.

Figure 11 is an enlarged cross-sectional view of the distributing flue 26 of the apparatus shown in Figure 7, taken on approximately the line 11—11 of Figure 12; and Figure 12 is a longitudinal sectional view of said flue, taken on the line 12—12 of Figure 11.

In Figures 1 to 6 of the drawings I have illustrated an apparatus that represents the construction of a greenhouse or forcing pit embodying my invention. Said apparatus is provided with side and end walls and a roof, and a transversely-disposed partition A is arranged adjacent one end of same so as to separate the interior of the house into two sections or rooms, one of which serves as a boiler room. The other section or room of the house is provided with one or more soil beds that contain seeds or plants and which are mounted on perforated or porous supporting structures through which warm, humid air is forced directly into the soil bed. Any suitable perforated or porous supporting structure can be used for sustaining the soil bed and any suitable means can be used for blowing warm, humid air into the soil bed. Generally, the greenhouse will comprise a boiler 7 that is adapted to be used for heating the greenhouse and for supplying hot water to an air washing fan or a humidifying apparatus 24, which, in turn, is used to blow warm, humid air into the soil bed so as to heat, moisten and ventilate said bed. The particular design and arrangement of the soil beds is immaterial, but in the greenhouse shown in Figure 1 soil beds 22 are arranged on benches between aisles through which the operatives in charge of the greenhouse can walk, the roof of the house being high enough to permit the operatives to stand in an upright position. The soil beds 22 are arranged over air chambers 18 and are carried by perforated supporting structures herein illustrated as being formed by perforated tile 20 of the kind shown in Figures 4, 5 and 6 of the drawings.

The humidifying fan 24, previously referred to, may be of any suitable type, so long as it is capable of combining moisture with air and then forcing said moisture-laden air through the air chambers 18 into the soil beds 22 arranged above said air chambers. One type of humidifying fan that is well adapted for this purpose is the humidying fan described in my U. S. Patents Nos. 789,247, dated May 9, 1905; 838,602, dated December 18, 1906 and 686,706, dated September 24, 1907, said fan comprising a rotatable filter ring to which hot water is supplied and blades arranged so as to draw air into the end of the casing of the fan through or over said filter ring, and then expel said moisture-laden air through the discharge opening of the fan casing. Air distributing flues 26 or passageways lead from the outlet of the fan 24 to the air chambers 18 and in order to prevent premature condensation of the water vapor before it reaches the soil beds, heating elements herein illustrated as radiator pipes 13 are arranged inside of the air chambers 18, said radiator pipes being supplied with a heating medium from the boiler 7 and also being used for maintaining the interior of the greenhouse at the proper temperature in cold weather. Any suitable type or kind of boiler 7 may be used, but I prefer to use a cast iron sectional boiler of sufficient capacity to keep the greenhouse at a temperature of 60° to 70° at zero weather and supply feed water to said boiler from an inflow pipe 5 leading from an expansion tank 2 to which fresh water is supplied by a pipe 1 equipped with a water inlet valve 3 that is governed by a ball float 4, as shown in Figure 1. A stand pipe 8 that projects upwardly from the boiler 7, as shown in Figure 3, connects with a flow pipe 9 that extends longitudinally of the greenhouse to a down-take pipe 10 at the opposite end of same, which communicates with a distributing header 11 from which distributing branches 12 lead to the radiator pipes 13 arranged inside of the air chambers 18. The distributing branches 12 are equipped with regulating valves 14, as shown in Figure 2, and the discharge ends of the radiator pipes 13 are connected with collector headers 15 from which leader pipes 16 extend to the boiler, as shown in Figure 1. The water that is used to moisten the air which is drawn through the fan 24 is supplied to said fan by a hot water pipe 17 that leads from the stand pipe 8 and a return pipe 6 leads from said fan back to the expansion tank 2.

In Figure 1 of the drawings the reference character 25 designates the air inlet of the fan 24 and the reference character 27 designates air outlets that lead from the air distributing flues 26 to the front ends of the air chambers 18 beneath the soil beds, the air chambers 18 being provided at their rear ends with outlets 29 through which the air escapes from said chambers into a return flue 31 that leads back to the air inlet 25 of the fan 24. Air dampers or doors 29ᵃ can be used to govern the escape of the air from the air chambers 18 into the return flue 31, and a damper 30 can be used for governing the passage of the air from said return flue to the inlet of the fan. If desired, the greenhouse can be equipped with ventilating chimneys 32, as shown in Figures 1 and 2.

In the event it is desired to use the air in the air chambers 18 to heat the plant space 23 of the greenhouse in cold weather and to cool said space in hot weather, said air chambers can be provided with outlet openings 290 equipped with valves 290ᵃ, through which large quantities of either warm and dry or humid air or cool air, either dry or humid, can be admitted to the plant space 23.

When the boiler 7 is set in operation the water begins to rise in the stand pipe 8 and to overflow into the flow pipe 9. In the flow pipe 9 the water loses some of its heat by radiation and becomes heavier. The sustained rising of the warm water causes it to flow down grade in the flow pipe 9 and then to drop into the down-take 10 through which it flows to the distributing header 11, thence to the branches 12 and from said branches into the radiator pipes 13 underneath the soil beds. The water runs slowly through the radiator pipes 13 and loses more heat by radiation to the walls of the air chamber 18, tiles 20 in the tops of said air chambers and indirectly to the soil beds chambers 22. The greatly cooled water then flows into the collecting headers 15 and leader pipes 16, which return the circulating water back into the boiler 7 for reheating and recirculation.

When the radiator pipes have become warm the wheel of the fan 24 may be set in operation and hot water brought from the stand pipe 8 through the supply pipe 17 and sprinkled onto the inside of the rotating filter screen of said fan. The fan then aspires air from the inside of the greenhouse and exposes it to violent contact with the hot water on the filter screen. This contact causes the air to become warm and to absorb some of the water as vapor. The air is here saturated to 95% of its capacity at about 80° temperature. In this condition the air is blown forward by the fan 24 through the air chambers 18 in contact with the radiator pipes 13 in said chambers, and said air then enters the soil beds 22 through the perforations in the supporting structures 20 of said beds. Since the temperature of the soil beds is always lower than that of the warm, humid air, which is being forced into said beds through the orifices in the supporting structures for said beds, the contact of the air with the soil beds results in the condensation into water of some of the water vapor in the humid air. This condensation also changes some of the latent heat of the vapor into sensible heat in the resulting condensed water. This water and its sensible heat are two new products which originated during the condensation of some of the vapor within the soil beds. Both of these two products are then taken up by the soil beds and by the seeds and roots therein, causing germination and growth of new plants. As previously stated, premature condensation of the water vapor is prevented by causing the air flowing through the air chambers 18 to contact with radiator pipes 13 which supply additional heat to the air being forced into the soil beds.

The above process requires only periodical operations, and thus leaves ample time for mere heating and ventilating of the greenhouse, even in severe weather. For heating purposes it is only necessary to cut off the supply of hot water to the filter ring of the fan through the pipe 17 and then use the apparatus for blowing warm air through the outlets 290 into the plant space 23. In summer time the air in the greenhouse can be cooled by passing outside air through the fan 24 and then discharging said air into the plant space 23. In order to economize in the heating and watering operations, I use the full amount of the sensible heat in the return pipe and also the latent and sensible heat in the return air and of the vapor by returning the cool water from the radiator pipes 13 back to the boiler through the leader pipes 16, by returning the cooled water from the humidifying fan 24 back to the expansion tank 2 and by returning the cooled air from the soil beds back to the humidifying fan. It often happens in certain seasons of the year, when no artificial heat is conveniently available, that forcing units should be dried out and ventilated. Therefore, I prefer to provide the greenhouse with ventilating chimneys 32 which will become warm from sunshine and will then operate to ventilate the greenhouse. Similar but better effects can be attained by causing the fan 24 to aspire air from outdoors and blow it in dry condition through the air chambers, soil beds and plant spaces.

The apparatus shown in Figures 7 to 12, inclusive, of the drawings represents how hot boxes or forcing fields can be made to embody my invention. Said apparatus comprises elements similar to those of the apparatus shown in Figures 1 to 6, and designated by corresponding reference characters, but in the apparatus shown in Figures 7 to 12 air ducts 19 formed from perforated tile 21 are arranged under the soil beds and are supplied with warm, humid air through a distributing flue 26 which is also connected by means of air outlet 290 with the plant space 23 in the upper portion of the hot boxes that contain the soil beds, communication between said flue and outlet being governed by valves 290ª. In some instances, instead of forming the air ducts 19 from hollow, perforated tile 21, the soil beds can be supported by masses of broken stone or the like in which the radiator pipes are imbedded, said rocky material being desirable, in that it tends to maintain a more even temperature of the soil beds and the interstices between the small stones or pieces of rocky material serving as air ducts which effect a very equal distribution of the warm, humid air throughout the body of the soil beds. In the apparatus shown in Figure 7 the transverse partition A at one end of the apparatus is provided with an air passageway 33 which leads in the return flue 31, as shown in Figure 7.

I claim:

1. An apparatus for inducing the germination and growth of seeds and plants, comprising a perforated or porous support that sustains a soil bed, an air passageway arranged so that air can pass from same upwardly into said soil bed, a humidifying fan for forcing air through said passageway provided with a filter ring through which the air passes, and means for supplying moisture at a high temperature to said fan so as to cause the seeds or plant roots in said bed to be subjected to the action of moisture, air and heat.

2. An apparatus for inducing the germination and growth of seeds and plants, comprising a soil bed, a perforated or porous support for said bed, an air passageway arranged so that air can pass from same upwardly into said bed, a humidifying fan for forcing air through said passageway provided with a filter ring, heat radiating devices arranged in said air passageway, a boiler for supplying a heating medium to said heat radiating devices, and means for supplying hot water from said boiler to the filter ring of said humidifying fan so as to cause warm, humid air to pass upwardly through said soil bed when said fan is in operation.

JOHN ZELLWEGER.